US009676305B2

United States Patent

(12) United States Patent
Gujarathi et al.

(10) Patent No.: US 9,676,305 B2
(45) Date of Patent: Jun. 13, 2017

(54) VEHICLE SEAT WITH INTEGRATED CHILD SEAT

(71) Applicant: TUM CREATE LIMITED, Singapore (SG)

(72) Inventors: Rahul Gujarathi, Singapore (SG); Sebastian Bender, Singapore (SG); Stephan Jin Siong Schickram, Singapore (SG); Andreas Herbert Schwab, Singapore (SG)

(73) Assignee: TUM CREATE LIMITED, Singapore (SG)

( * ) Notice: Subject to any disclaimer, the term of this patent is extended or adjusted under 35 U.S.C. 154(b) by 0 days.

(21) Appl. No.: 14/829,445

(22) Filed: Aug. 18, 2015

(65) Prior Publication Data

US 2016/0046214 A1 Feb. 18, 2016

(30) Foreign Application Priority Data

Aug. 18, 2014 (SG) .......................... 10201404999W

(51) Int. Cl.

| | |
|---|---|
| ***A47C 15/00*** | (2006.01) |
| ***B60N 2/32*** | (2006.01) |
| ***B60N 2/26*** | (2006.01) |
| ***B60N 2/20*** | (2006.01) |
| ***B60N 2/64*** | (2006.01) |
| *B60N 2/02* | (2006.01) |

(52) U.S. Cl.

CPC ............... *B60N 2/32* (2013.01); *B60N 2/206* (2013.01); *B60N 2/26* (2013.01); *B60N 2/265* (2013.01); *B60N 2/643* (2013.01); *B60N 2002/0216* (2013.01); *B60N 2205/30* (2013.01); *B60N 2205/35* (2013.01)

(58) Field of Classification Search

CPC . B60N 2/206; B60N 2/26; B60N 2/32; B60N 2/265

USPC .................................................. 297/113, 238

See application file for complete search history.

(56) References Cited

U.S. PATENT DOCUMENTS 4,541,654 A * 9/1985 Jonasson .................. B60N 2/20 280/801.1
4,655,503 A * 4/1987 Kamijo .................. B60N 2/203 297/103
5,433,503 A * 7/1995 De Filippo .......... B60N 2/4613 297/113
5,540,479 A * 7/1996 Thomas ............... B60N 2/4613 297/113
5,662,377 A * 9/1997 Holdampf ............ B60N 2/3013 297/14
5,722,724 A * 3/1998 Takei ................... B60N 2/3084 297/114
6,089,662 A * 7/2000 Lambert .............. B60N 2/3084 297/238
6,213,546 B1 * 4/2001 Malusev .............. B60N 2/4613 297/113

(Continued)

*Primary Examiner* — Laurie K Cranmer

(57) ABSTRACT

A vehicle seat with integrated child seat comprising: a passenger seat backrest and a seat cushion configured to seat a front-facing adult, the passenger seat backrest further configured to be foldable onto the seat cushion; a child seat backrest integrated with the passenger seat backrest, the child seat backrest configured to be raisable from the passenger seat backrest when the passenger seat backrest is folded onto the seat cushion so as to form a rear-facing child seat.

3 Claims, 5 Drawing Sheets

12 100 60 110 130 80 90 40 50 70 70 20 30

(56) References Cited

U.S. PATENT DOCUMENTS

| | | | | |
|---|---|---|---|---|
| 7,213,879 | B2 * | 5/2007 | Oto | B60N 2/2851 297/238 |
| 7,458,634 | B2 * | 12/2008 | Schlecht | B60N 2/4613 297/112 |
| 7,458,635 | B2 * | 12/2008 | Mendis | B60N 2/206 297/112 |
| 7,658,431 | B2 * | 2/2010 | Foussianes | B60N 2/002 296/68.1 |
| 7,887,140 | B1 * | 2/2011 | Forlivio | B60N 2/26 297/238 |
| 8,544,950 | B2 * | 10/2013 | Merensky | B60N 2/3084 297/238 |
| 8,622,468 | B2 * | 1/2014 | Masuda | B60R 5/006 297/113 |
| 8,657,371 | B2 * | 2/2014 | Matori | B60N 2/206 297/188.04 |
| 2002/0030394 | A1 * | 3/2002 | Ito | B60N 2/3084 297/256 |
| 2006/0006712 | A1 * | 1/2006 | Clement | B60N 2/2866 297/238 |
| 2007/0114824 | A1 * | 5/2007 | Mendis | B60N 2/206 297/238 |
| 2012/0228909 | A1 * | 9/2012 | Blau | B60N 2/2806 297/238 |
| 2015/0130231 | A1 * | 5/2015 | Lindsay | B60N 2/2812 297/120 |
| 2015/0130235 | A1 * | 5/2015 | Herut | B60N 2/2878 297/238 |

* cited by examiner

VEHICLE SEAT WITH INTEGRATED CHILD SEAT

CROSS-REFERENCE TO RELATED APPLICATIONS

This application claims priority to Singapore Application No. SG 10201404999W filed with the Intellectual Property Office of Singapore on Aug. 18, 2014 and entitled "VEHICLE SEAT WITH INTEGRATED CHILD SEAT," which is incorporated herein by reference in its entirety for all purposes.

FIELD OF THE INVENTION

This invention relates to a vehicle seat with an integrated child seat, which can seat an adult or a child safely.

BACKGROUND OF THE INVENTION

Currently, few vehicles (land, water or aviation) provide integrated child seats. Child seats are bulky, heavy. If they are stored in the vehicle when not in use, they take up luggage space. In addition, the process of mounting the child seat securely when it is needed is tedious and time consuming.

Especially in publicly used vehicles such as taxis, child seats are not offered for passengers below twelve years of age. Parents are currently required to provide their own child seats, resulting in many parents not doing so. Even if parents provide their own child seats, they may have difficulty safely securing the child seat in the vehicle. These situations result in children being usually transported unsafely, making the baby or child as well as other passengers traveling together unsafe in a crash situation.

SUMMARY OF INVENTION

The present invention addresses the issue of a lack of child safety systems in vehicles and particularly in taxis. The invention integrates a rear-facing child seat with a front-facing adult seat of the vehicle to solve the above stated problems. The rear-facing position of the child seat increases the safety of the child in case of a frontal crashes, which usually have higher acceleration forces as compared to the rear or side crash scenarios. Not only is the safety of the child increased but where the integrated vehicle seat is a front passenger seat of a taxi, the child is also facing its parents sitting on the rear bench for better interaction.

The invention does not require any separate additional parts for converting between a front-facing adult passenger seat and a rear-facing child seat. The passenger seat backrest merely needs to be folded flat after which the child car seat can be formed or set up by pulling up the child seat backrest.

According to a first aspect, there is provided a vehicle seat with integrated child seat comprising: a passenger seat backrest and a seat cushion configured to seat a front-facing adult, the passenger seat backrest further configured to be foldable onto the seat cushion; a child seat backrest integrated with the passenger seat backrest, the child seat backrest configured to be raisable from the passenger seat backrest when the passenger seat backrest is folded onto the seat cushion so as to form a rear-facing child seat.

A portion of the seat cushion may be exposed for rear-facing sitting thereon by the child when the child seat backrest has been raised.

Alternatively, the child seat backrest may have a thickness that is of a partial thickness of the passenger seat backrest such that when the child seat backrest has been raised, a child seating area is exposed that is formed by a remaining thickness of the passenger seat backrest.

The child seat backrest may be configured to be raisable via a raising mechanism comprising: a link having a first end pivotably attached to a first pivot fixed at an upper part of a side of the child seat backrest and a second end pivotably attached to a pivot fixed at an upper part of an inner side of the passenger seat backrest facing the side of the child seat backrest; a sliding rail fixedly attached to the inner side of the passenger seat backrest; and a slider pivotably attached to a second pivot fixed at a lower part of the side of the child seat backrest, the slider configured to slide along the sliding rail.

Alternatively, the child seat backrest may be configured to be raised via a raising mechanism comprising a pivot configured to pivotably engage a lower part of a side of the child seat backrest with an upper part of an inner side of the passenger seat backrest.

The vehicle seat with integrated child seat may further comprise a locking system configured to fasten itself to keep the integrated vehicle seat deployed as the child seat.

The locking system may be configured to be adjustable to adjust angle of inclination of the child seat backrest.

The vehicle seat with integrated child seat may further comprise a five-point seat belt configured to secure a child seated in the child seat.

The vehicle seat with integrated child seat may be at least one of: a front passenger seat of an automobile and a passenger seat in a second row of seats in an automobile having at least two rows of seats.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Figure 1A:
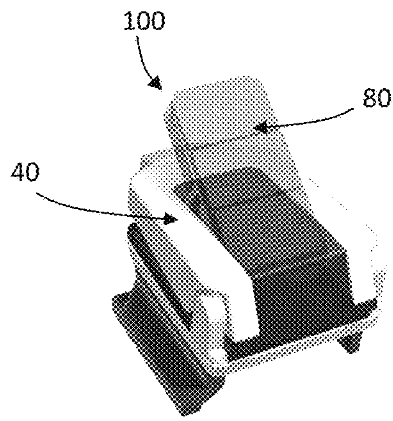
FIG. 1A is a perspective view of a first exemplary embodiment of an integrated vehicle seat of the present invention in a child seat position.
Figure 1B:
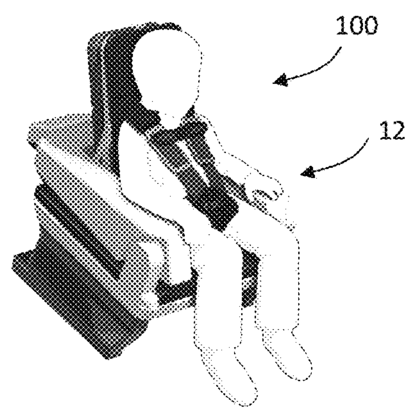
FIG. 1B is a perspective view of the integrated vehicle seat of FIG. 1A having a child secured therein.

Exemplary embodiments of a vehicle seat 100 with integrated child seat 12 selectably configurable as an adult passenger seat 10 or child seat 12 will be described below with reference to FIGS. 1 to 6B, in which the same reference numerals are used to denote the same or similar parts.

Figure 2:
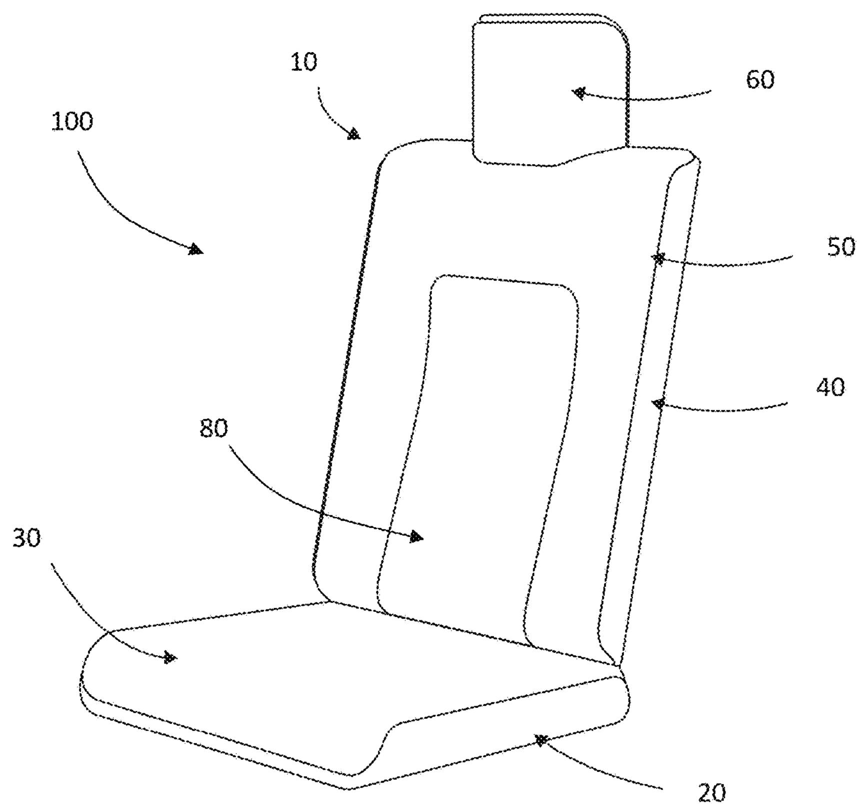
FIG. 2 is a front perspective view of the integrated vehicle seat in an adult seat position.
Figure 3A:
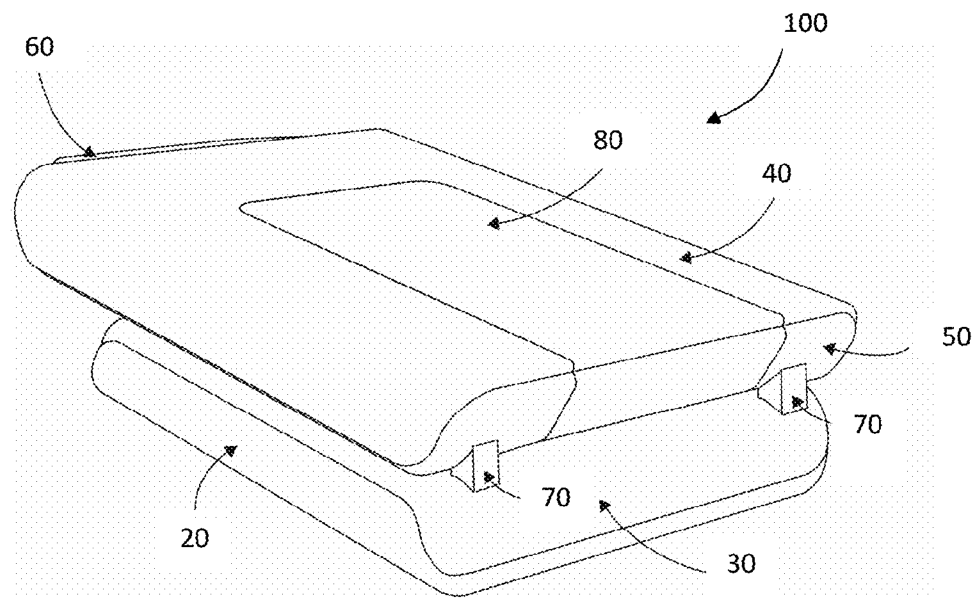
FIG. 3A is a rear perspective view of the integrated vehicle seat of FIG. 2 in a folded position and a perspective view of the child seat in a stored position.
Figure 3B:
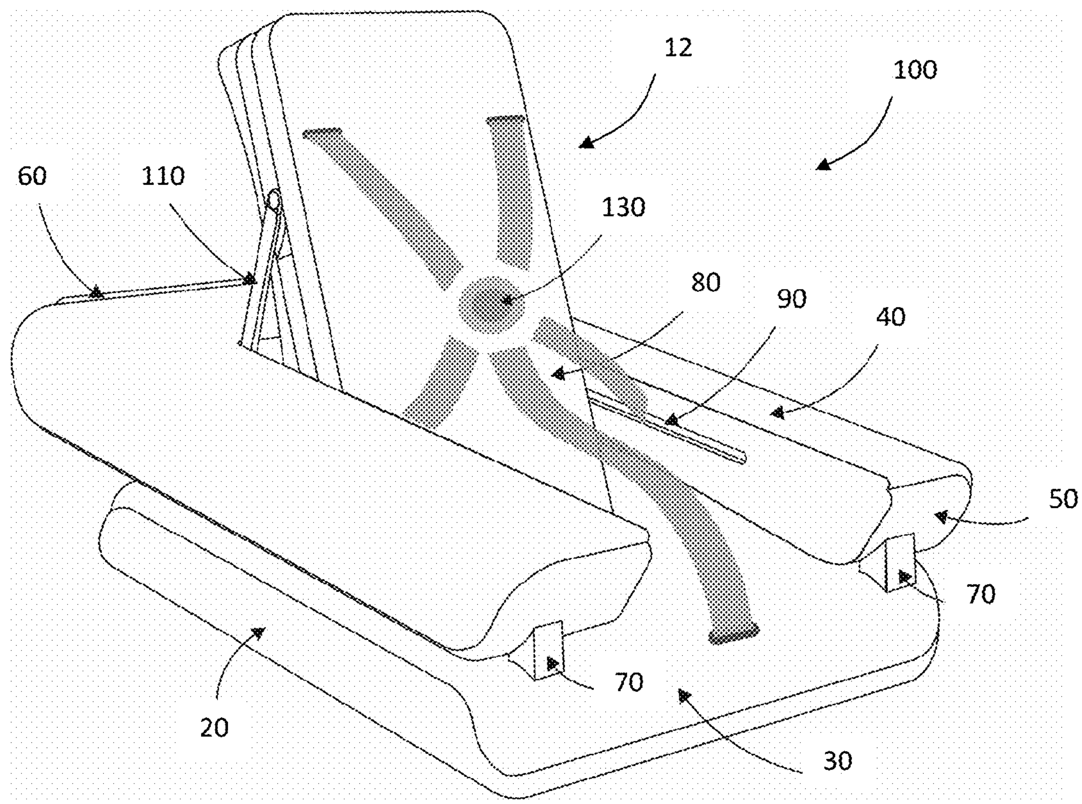
FIG. 3B is a perspective view of the integrated vehicle seat of FIG. 3A in a child seat position.

The vehicle seat 100 with integrated child seat 12, shown in FIG. 2 in an adult seat 10 position, comprises a seat 20 having a seat cushion 30 and a pivotably mounted passenger seat backrest 40 with a backrest cushion 50 for seating a front-facing adult. The passenger seat backrest 40 may be provided with any suitable kind of headrest 60, i.e., a foldable, adjustable or combined headrest 60. The passenger seat backrest 40 is integrated with a child seat backrest 80 that is configured to be raisable from the passenger seat backrest 80 to form a rear-facing child seat 12 when the passenger seat backrest is folded onto the seat cushion. The child seat backrest 80 is configured to provide head support for a child seated in the child seat 12, and is preferably covered with cushion 50 on both sides. The seat 20 and the passenger seat backrest 40 are connected through hinges 70 that allow the passenger backrest 40 to be rotated. In this way, the passenger backrest 40 can be folded down until it lies flat on the seat cushion 30, as shown in FIG. 3A When the passenger seat backrest 40 is in the folded position parallel to the seat cushion 30, the child seat backrest 80 which is an integral part of the passenger seat backrest 40 can be raised (as seen in FIG. 1A) to expose a seating area for a child, thereby deploying the child seat 12. In the configuration as shown in FIG. 3B, the child seat backrest 80 is a full thickness of the passenger seat backrest 40 so that when the child seat backrest 80 has been raised, a portion of the seat cushion 30 is exposed as the child seating area for a rear-facing child.

To form the child seat 12, when a trigger or deployment mechanism (not shown) is activated, a lock system (not shown) is released and enables the child seat backrest 80 to be deployed. Any suitable type of release locking mechanism can be used for this purpose.

Figure 4A:
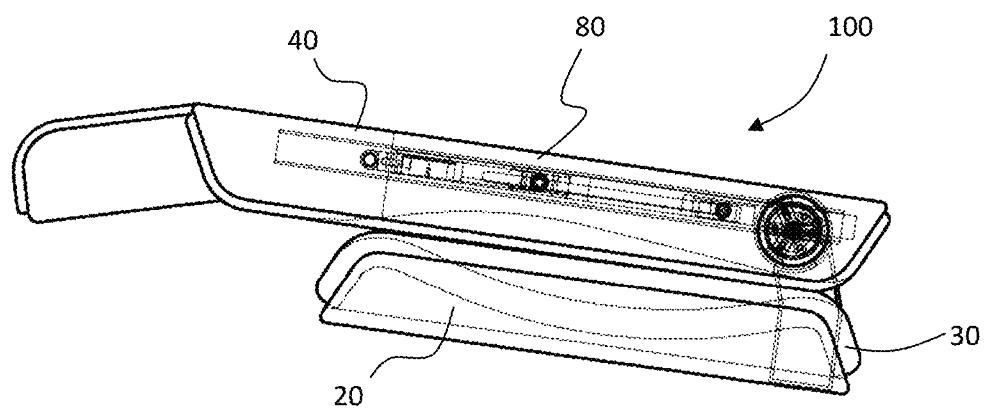
FIG. 4A is a schematic illustrative side view of the integrated vehicle seat of FIG. 3A.
Figure 4B:
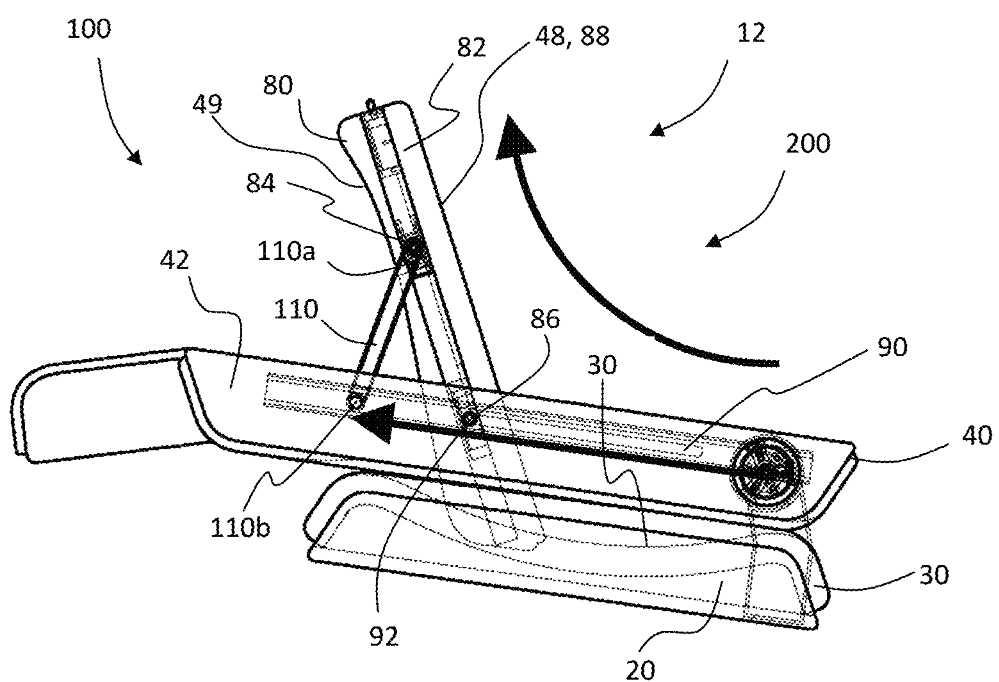
FIG. 4B is a schematic illustrative side view of the integrated vehicle seat of FIG. 3B.

In a first embodiment as shown in FIGS. 4A and 4B, the child seat backrest 80 is movably mounted to the passenger seat backrest 40 via a raising mechanism that comprises a sliding rail 90 and a link 110 forming a crank-slider mechanism 200 in which the child seat backrest 80 acts as a connecting rod. The raising mechanism is preferably provided on both sides of the child seat backrest 80 for strength, stability and smooth operation. On each side 82 of the child seat backrest 80, the link 110 is provided having a first end 110*a* pivotably attached to a first pivot 84 fixed at an upper part of the side 82 of the child seat backrest 80. A second end 110*b* of the link 110 is pivotably attached to a pivot 44 fixed at an upper part of an inner side 42 of the passenger seat backrest 40 that faces the side 82 of the child seat backrest 80. The sliding rail 90 is fixedly attached to the inner side 42 of the passenger seat backrest 40, covering most of the length of the inner side 42. A slider 92 is pivotably attached to a second pivot 86 fixed at a lower part of the side 82 of the child seat backrest 80. The slider 92 is configured to slideably engage the sliding rail 90. In this way, the link 110 acts as the crank of the mechanism 200 while the child seat backrest 80 acts as a connecting rod with the slider 92.

Rotation of the link 110 enables the child seat backrest 80 to be positioned in an upright supporting position, thereby deploying the child seat 12.

In this embodiment, a rear surface 48 of the passenger seat 40 forms a child support surface 88 of the child seat backrest 80, so that a front-facing adult does not share the same back support surface as a rear-facing child when each uses the vehicle seat 100 with integrated child seat 12. Hence, the rear surface 48 can be shaped ergonomically to suit the child's body, while the front surface 49 of the passenger seat 40 can be shaped ergonomically to suit an adult's body. The integrated child seat 12 does not in any way affect the functionality of the normal adult passenger seat 10. Existing seat designs which have ventilation air vents in the cushion 30 could also be incorporated in the design without any major redesign of the system.

The lock system is configured to fasten itself when the child seat 12 has been deployed, i.e., when the seating position for the child is accomplished. Different adjustments are possible to provide different inclination angle for the child seat backrest 80 for different seating positions of the child. The seating positions could be adapted to any position between sitting upright to inclined lying of the child by using the locking options of the mechanism.

The child seat backrest 80 is incorporated with a seat belt 130, preferably a 5-point harness. The seat belt 130 enables the child to be secured to the child seat 12 safely. The seat belt 130 can be stored and kept from view in the normal passenger seat configuration by having a zip cover to cover it when not in use.

Rear portions 40R of the passenger seat backrest 40 that do not form part of the child seat backrest 80 function as arm rests and side support for the child which may be cushioned to provide more seating stability and comfort to the child. The arm rests 40R may optionally be further incorporated with features (not shown) such as cup holders or a storage compartment by simply having a cavity formed to receive a mug or an enclosure with a lid.

An activating lever (not shown) for deploying the child seat 12 and seat adjustment is preferably placed within reach of the driver (i.e., on the side of the integrated vehicle seat 100 closest to the driver) so that the child seat 12 can be deployed by the driver without the need for him to alight from the car. For usage of the vehicle seat 100 in all countries and situations, the activating lever is positioned on both sides of the seat 100. Thus, the child seat 12 can be deployed from all sides (e.g. from the driver's seat or outside the vehicle). It is also possible to incorporate an automated solution where motors or actuator are used to deploy the child seat 12 with the push of a button.

Figure 5A:
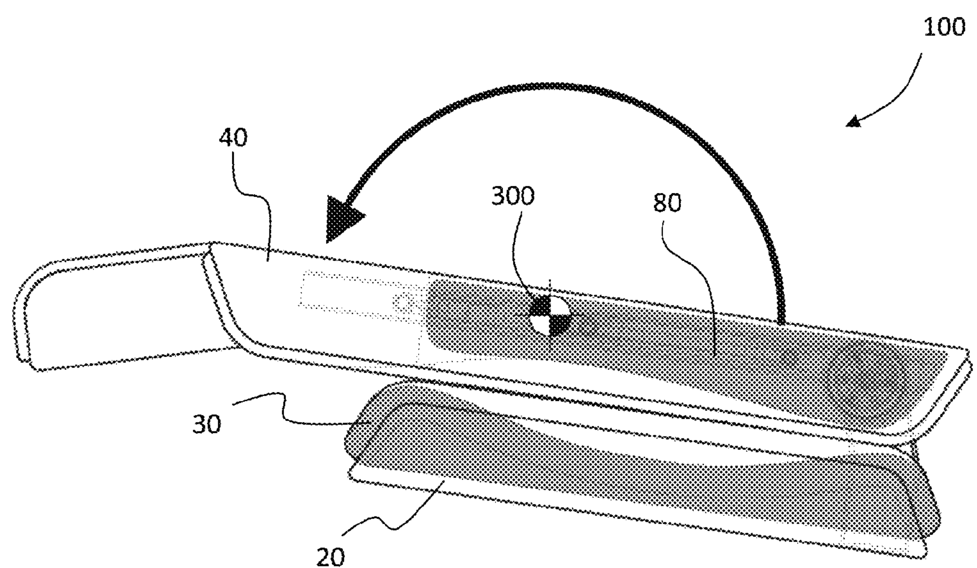
FIG. 5A is a schematic illustrative side view of a second exemplary embodiment of an integrated vehicle seat in a folded position with the child seat in a stored position.
Figure 5B:
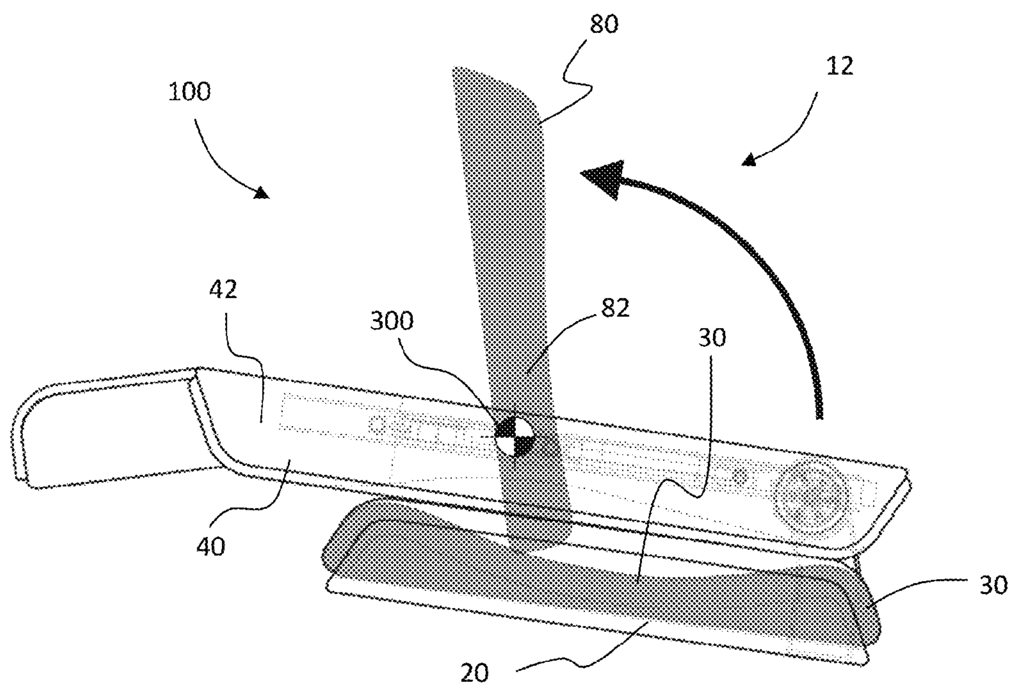
FIG. 5B is a schematic illustrative side view of the integrated vehicle seat of FIG. 4A in a child seat position.

In a second embodiment as shown in FIGS. 5A and 5B, the raising mechanism comprises a simple hinge or pivot 300 that pivotably engages a lower part of the side 82 of the child seat backrest 80 with an upper part of the inner side 42 of the passenger seat backrest 40 to allow the child seat backrest 80 to be simply flipped up to deploy the child seat 12. In this second embodiment, a front surface 49 of the passenger seat backrest 40 forms the child support surface 89 of the child seat backrest 80. However, use of the rotational sliding mechanism 200 of the first embodiment as described above is structurally more stable while offering advantages like different backrest angles to suit the fast changing body dimensions of a growing child.

Figure 6A:
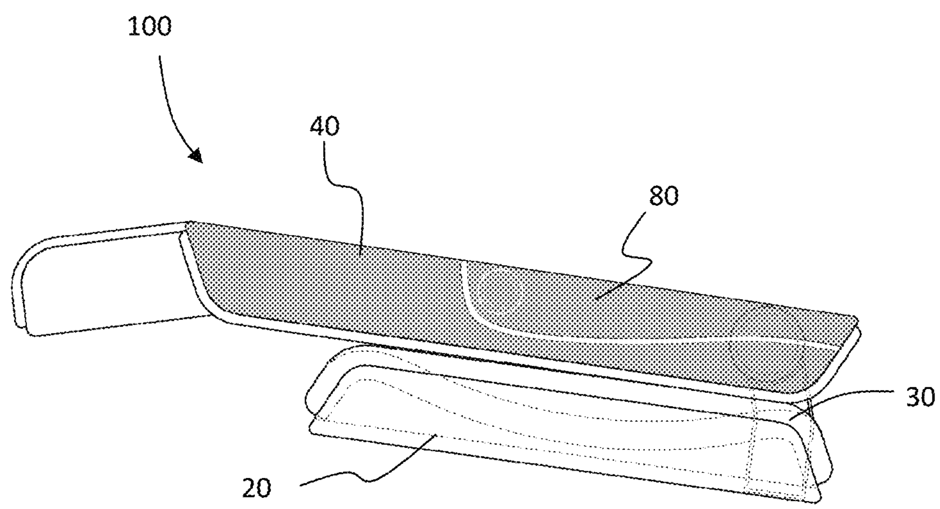
FIG. 6A is a schematic illustrative side view of a third exemplary embodiment of an integrated vehicle seat in a folded position with the child seat in a stored position.
Figure 6B:
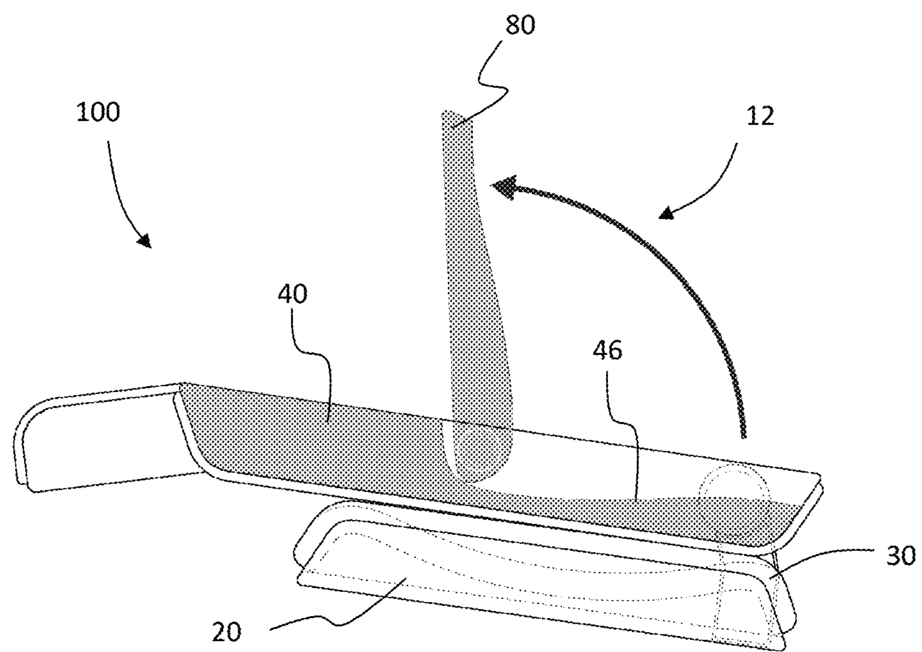
FIG. 6B is a schematic illustrative side view of the integrated vehicle seat of FIG. 6A in a child seat position.

In a third embodiment, instead of the child seat backrest 80 being the full thickness of the passenger seat backrest 40, the child seat backrest 80 may have a thickness that is only of a partial thickness of the passenger seat backrest 40, as shown in FIGS. 6A and 6B. In such embodiments, raising the child seat backrest 80 after folding down the passenger seat backrest 40 exposes a child seating area 46 that is formed by the remaining thickness of the passenger seat backrest 40. In such an embodiment, the remaining thickness of the passenger seat backrest 40 can be specifically contoured 46 to provide better seating comfort for the child. It should be understood that while the raising mechanism for the third embodiment as depicted in FIGS. 6A and 6B is similar to the second embodiment described above, the raising mechanism for the third embodiment can alternatively be that as described for the first embodiment above.

The present invention thus provides a vehicle seat with integrated child seat that is a safe and fully functional integration of a rear-facing child seat 12 with a front-facing adult passenger seat 10 such that it does not use any additional parts stored elsewhere in the car to form a usable child seat 12. The method of folding down the passenger seat backrest 40 and swinging out the child seat backrest 80 from the passenger seat backrest 40 is simple, robust and space saving. The rotational sliding mechanism 200 allows the child seat backrest 40 to be locked at different angles for suiting various body dimensions and seating positions for the child. The deployment mechanism may also be motorised such that activation can be achieved by the press of a button. The driver is thus able to enable or deploy the child seat 12 with ease without alighting from the vehicle. In some embodiments, the child is seated on the same seating surface 30 as an adult using the passenger seat 10 normally would, but in all embodiments the child is facing the rear of the car for better crash safety (front airbag has to be disabled). Where the vehicle seat with integrated child seat is a front passenger seat of a taxi, the child is also able to interact with its parents seated on the rear bench.

As the neck is the most vulnerable region of children, restraining only the child's body with a seat belt system while the head is unsupported leads to high fatality rate in front collisions. Rearward facing allows the distribution of inertia forces acting on a child's spine during a frontal collision over a larger area against the child seat backrest 80 which is configured to provide head support, as opposed to concentrating the force on the seat belts. The child is restrained using its separate 5-point restraining system 130 for safety which has been integrated into the seat base 30 and can be stored under the seat cushion 30 when not in use. When needed, it can be pulled out of the cushion 30 and fastened at the child seat backrest 40 using standard ISOFIX or LATCH system buckles.

Whilst there has been described in the foregoing description exemplary embodiments of the present invention, it will be understood by those skilled in the technology concerned that many variations in details of design, construction and/or operation may be made without departing from the present invention. For example, while the integrated vehicle seat has been described above as being a front passenger seat of an automobile, the integrated vehicle seat may alternatively be a passenger seat in a second row of seating in an automobile having two or three rows of seats. One or more of the integrated vehicle seat may be provided in a single vehicle among any of the front passenger seat and seats in the other row or rows of seating in the automobile. While two embodiments of the raising mechanism for the child seat backrest have been described above with reference to FIGS. 4A to 5B, other appropriate mechanisms may be used as the raising mechanism to raise the child seat backrest to be raised from the passenger seat backrest when the passenger seat backrest is folded onto the seat cushion so as to form a rear-facing child seat.

The invention claimed is:

1. A vehicle seat with integrated child seat comprising:

a passenger seat backrest and a seat cushion configured to seat a front-facing adult, the passenger seat backrest further configured to be foldable onto the seat cushion;

a child seat backrest integrated with the passenger seat backrest, the child seat backrest configured to be raisable from the passenger seat backrest when the passenger seat backrest is folded onto the seat cushion so as to form a rear-facing child seat, wherein the child seat backrest is configured to be raisable via a raising mechanism comprising:

a link having a first end pivotably attached to a first pivot fixed at an upper part of a side of the child seat backrest and a second end pivotably attached to a pivot fixed at an upper part of an inner side of the passenger seat backrest facing the side of the child seat backrest;

a sliding rail fixedly attached to the inner side of the passenger seat backrest; and a slider pivotably attached to a second pivot fixed at a lower part of the side of the child seat backrest, the slider configured to slide along the sliding rail, wherein the raising mechanism allows the child seat backrest to be locked at different angles, and wherein the child seat backrest is a full thickness of the passenger seat backrest so that a portion of the seat cushion is exposed for rear-facing sitting thereon by a child when the child seat backrest has been raised.

2. The vehicle seat with integrated child seat of claim 1, further comprising a five-point seat belt configured to secure a child seated in the child seat.

3. The vehicle seat with integrated child seat of claim 1, wherein the vehicle seat with integrated child seat is at least one of: a front passenger seat of an automobile and a passenger seat in a second row of seats in an automobile having at least two rows of seats.

* * * * *